June 20, 1933.   H. W. HARMAN   1,915,259
MAGNETIC SEPARATOR
Filed Nov. 29, 1929
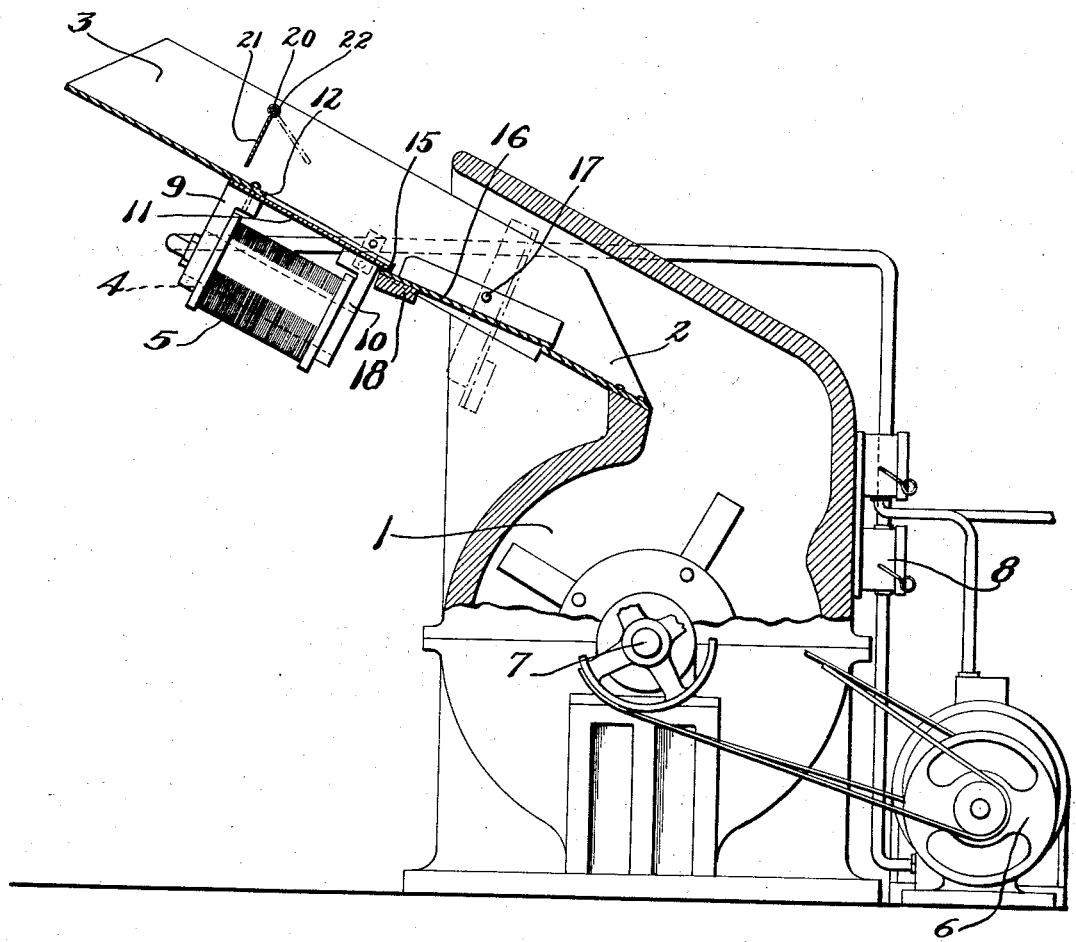
Inventor
Harold W. Harman
By Wheeler Wheeler & Wheeler
Attorneys Patented June 20, 1933

1,915,259

UNITED STATES PATENT OFFICE

HAROLD W. HARMAN, OF WAUWATOSA, WISCONSIN, ASSIGNOR TO MAGNETIC MANUFACTURING COMPANY, OF MILWAUKEE, WISCONSIN, A CORPORATION OF WISCONSIN

MAGNETIC SEPARATOR

Application filed November 29, 1929. Serial No. 410,460.

This invention relates to improvements in magnetic separators. The present application is a continuation in part of my application No. 378,078 filed July 13, 1929.

The invention has for its primary object the provision of a novel and simple form of magnetic trap adapted to be incorporated in a feed chute and automatically operable upon energization and de-energization of its magnet to attract magnetic material traversing the chute, and to discharge such material therefrom.

It is the further object of the invention to provide a magnetic trap in which the same energy which retains magnetic material from traversing a chute to which the separator is applied, is utilized to close the trap and to hold the trap releasably in operative supporting relation with respect to non-magnetic material flowing through the chute.

The drawing illustrates diagrammatically in vertical section the application of a trap embodying this invention to a conventional hammer mill.

The mill shown for the purpose of illustrating the application of this invention appears at 1 and is supplied with material through a chute having a delivery portion 2 and a hopper portion 3. The trap which forms the particular subject matter of this invention is built into the chute and may take various forms, only one of which is illustrated.

In the present device the energizing magnet is stationary and comprises a core 4 supporting a winding 5 supplied with current from a D. C. generator 6 which may be driven from the mill shaft 7. There is a switch at 8 by which the supply of current to the winding 5 may be interrupted.

Secured to the ends of the core 4 are the pole members 9 and 10. Overlying the poles 9 and 10 and demountably secured to the bottom of the feed chute hopper 3 is a floor section 11 by means of which the magnet is supported. The floor section 11 may conveniently be made of non-magnetic material such as brass, but it may also be made of iron, steel, or other magnetizable material providing its design, with reference to its cross section, is such that it does not unduly short circuit the flux between pole pieces 9 and 10.

The bottom of the hopper portion 3 of the feed chute terminates above the plate 11, providing a shoulder at 12 behind which small particles of magnetizable material traversing the feed chute will lodge under the attraction of the pole piece 9 and will be held more readily than would be the case if the bottom of the entire feed chute constituted a plane surface.

The plate 11, is preferably made of non-magnetizable material, and overhangs at 15 to provide a polar extension between which, and the delivery portion of the chute, is an opening normally closed by the trap door 16. The use of non-magnetizable material eliminates residual magnetism which might otherwise interfere with quick opening of the trap door. In accordance with the present invention this door is preferably made of magnetizable material in the form of a shallow trough, the upturned sides of which are fulcrumed on supporting pins 17 for oscillatory movement between the full and dotted line positions in which it is illustrated in the drawing.

The end of the trap door which is uppermost when the door is closed, is provided with an armature bar 18 which underlies the overhanging polar extension 15 and is attracted by the pole member 10 when the magnet is energized. When the magnet is de-energized the armature bar 18 serves as a weight tending to cause the trap door to assume the position in which it is illustrated in dotted lines.

When the trap door is closed its lower end overlies the floor of the delivery portion 2 of the chute. In this position of the parts the opening in the chute is completely closed and non-magnetic material will pass freely through the chute to the mill 1 or any other mechanism.

In the opened position of the door 16 no material whatever can traverse the feed chute. Not only does the exposed opening coincide in width with the chute, but it will be noted that the free end of the door is elevated into the path of material which might tend to jump across the opening. Thus any such material is deflected through the opening.

If the door 16 is properly designed in accordance with the general proportions indicated in the accompanying drawing, it will be found that the energization of the magnet will act to draw the door about its fulcrum at 17 to the closed position illustrated in full lines. The use of the armature 18 increases the magnetic attraction of the pole piece 10 for the door. Such attraction is also increased by the design of the door and the fact that it is made of magnetizable material. The chute walls and bottom may be and ordinarily are made of non-magnetizable material such as zinc. The lower end of the chute may also be made of iron whereby the closing of the door tends to shorten flux paths from the magnet into the delivery portion 2 of the chute. It is possible also to make the entire chute of sheet iron, since the weight and quality of iron ordinarily used is easily saturated and does not objectionably short circuit flux between poles of the magnet.

When the mill is in operation the electrical current controlled by switch 8 and derived from the D. C. generator 6 or any other D. C. source may be used to energize the coil 5 and poles 9 and 10. Thereby the door will be attracted automatically to its closed position and upon reaching such position will be powerfully retained magnetically for the support of all non-magnetic material traversing the chute. The magnetic material will be held by poles 9 and 10, the shoulders at 12 and beyond the magnetic polar extension 15 being adapted to facilitate the action of the magnet in segregating magnetic from non-magnetic materials. The non-magnetic material will tend, by virtue of these shoulders, to cascade over magnetic material held by the magnet.

When the supply of current to magnet 5 is interrupted either by manipulation of switch 8 or by the slowing down or stoppage of the mill or otherwise, the magnetic trap herein described will automatically discharge its contents. The de-energization of the magnet permits the door 16 to drop by gravity to its dotted line position. The simultaneous release of the magnetic material held by the pole pieces 9 and 10 permits such material to fall through the opening exposed by the movement of the door.

It will be obvious that no further material can be fed through the chute to the mill until the trap door is closed by re-energizing the magnet. The fact that the door 16 is invariably open unless the magnet is energized, is a great protection to the mill against accidents such as might be occasioned if the opening of the door were dependent upon the observation of an operator that the magnet had ceased to function. There is no possibility in the device illustrated that the interruption of current might permit the bulk discharge into the mill of all magnet material theretofore accumulated by the trap. Neither is there any possibility with the present device of using the chute with the magnet de-energized since, except for the magnet, there is no means for holding the trap door shut.

There is an additional advantage in the construction herein disclosed due to the fact that the operator cannot forget to close the trap after energizing the magnet. It will be understood that the trap of the present device is fully automatic and closes and opens upon energization and de-energization of the magnet.

Where the volume of material traversing the chute 3 is variable, and particularly where its velocity is fairly high, it is quite desirable to provide means for automatically leveling off such material to uniform depth and obstructing excessive flow to the end that tramp iron or other magnetizable foreign matter may not be carried past the magnet at such a height thereabove, and with such velocity that the magnet cannot act thereon to hold it.

I have found a magnetic leveling device particularly effective in connection with the structure herein disclosed. A rod 20 crosses the chute between the top margins of its respective sides, and a plate 21 is beaded at 22 to embrace the rod, about which the plate is hingedly movable.

When the magnet is energized the attraction of its pole 9 holds the plate 21 at right angles to the bottom of chute 3, leaving a clearance of only about an inch between the lower margin of the plate and the bottom of the chute. Any material which can pass unobstructedly beneath the plate will be in such proximity to the magnet that the magnet will infallibly attract and trap all magnetic substances therein.

If a greater volume of material comes down the chute its passage will be yieldably opposed by plate 21 which will tend to level off such material to a depth of one inch and, failing this, will so obstruct the flow of larger volumes of material as to give the magnet time to act upon any remote magnetic substances carried by the greater depth of material. As soon as the excess quantity of material has passed, the attraction of pole 9 will restore the magnetizable plate 21 to its normal position as shown in the drawing.

I claim:

1. The combination with a chute having a tiltable trap door forming a portion of its bottom, of means for magnetically actuating said trap door to closed position, said means comprising a magnetic separator adapted in the closed position of said door to retain magnetic material traversing the chute, and means adapted upon de-energization of said separator to open said door whereby to release therethrough magnetic material trapped by said separator, said door having its discharge portion at its upper end and said end being downwardly tiltable.

2. The combination with a feed chute, of a magnetic separator comprising a magnet positioned to establish a magnetic field including the bottom of said chute, a tiltable trap door wholly beyond said magnet and forming a part of the chute bottom in the path of material traversing the chute and having its discharge portion adjacent the magnet, and means for opening and closing said door in accordance with the de-enerization and enerization of said magnet, said magnet having sufficient power to lift and close the door.

3. The combination with a feed chute, of a magnetic separator comprising a magnet positioned to establish a magnetic field including the bottom of said chute, a trap door having its upper end downwardly tiltable and positioned wholly beyond said magnet in the path of material traversing the chute, and means for opening and closing said door in accordance with the de-energization and energization of said magnet, said magnet having sufficient power to lift and close the door, said chute and portions of said door being made of magnetizable material whereby to provide a shortened flux path through said door portions to portions of said chute beyond said magnet as said door is closed.

4. The combination with a feed chute provided with a port at its bottom, of a trap door for said port pivotally mounted for movement between a position overlapping said chute in which said port is closed and a position in which said port is opened, said trap door being counterbalanced to swing easily toward its closed position while normally gravity operated to its open position, and an electro-magnetic separator associated with said chute in a position to intercept magnetic material traversing said chute toward the port therein, said separator including a pole member wholly beneath said chute in proximity to said port, and said door having a discharge and armature portion within the field of said pole member when said separator is energized, the attraction of said pole upon said armature in the open position of said door being sufficient to overcome the counterbalance of said door and to actuate it to its closed position.

5. The combination with a chute and a gate for controlling the discharge of material therefrom, of an electro-magnetic separator associated with said chute in a position to intercept magnetic material flowing therethrough, and an armature operatively connected with said gate and disposed in all positions of said gate within the field of said separator, said armature being more remote from said separator in the open position of said gate than in the closed position thereof, and the field of said separator being sufficiently powerful in its influence upon said armature to close said gate automatically when said separator is energized, a grinding device fed by said chute, and a source of electrical supply operatively connected with said electro-magnetic separator and provided with actuating means operatively connected to supply current to said separator when said grinding device is operative, whereby automatically to close said gate.

6. The combination with a chute having upstanding sides and an opening in its bottom, of a trap door pivoted within said chute and having flanges complementary to the sides thereof, said door being counterbalanced for ready movement to its closed position while normally gravity operated to an open position, and an electro-magnet mounted upon said chute and including within its field the interior of the chute and a portion of said door, said door portion being subject to attraction by said magnet and movable upwardly toward said magnet in a direction to close said door when said magnet is energized and movable downwardly from said magnet in a discharge direction when said magnet is deenergized.

7. The combination with a grinding device and a feed chute leading thereto, of a magnetic separator in said feed chute, means for energizing said separator solely when said grinding device is operating, and a trap door in said feed chute automatically controlled by the operation of the grinding device through said separator and provided with an armature portion adapted to be attracted by said separator and close said door when said separator is energized by the operation of the grinding device.

8. The combination with a grinding device, a feed chute leading thereto, an electro-magnetic separator associated with said feed chute and a discharge gate mounted on said chute below said separator, of means for automatically moving said gate to feeding position by said grinding device through said separator when said grinding device is placed in operation.

9. The combination with a chute having a magnetic separator associated therewith, a door forming a portion of the chute bottom for controlling the flow of material therethrough, said door being tiltable downwardly to discharge magnetized material in a direction other than that of the normal flow of material over said door, said magnetic separator including magnetic means for causing opening and closing of said door in accordance with the energization and deenergization of said separator.

10. The combination with a chute, a tiltable door forming a portion of said chute bottom for controlling the flow of material therethrough, said door being pivoted about an axis extending transversely of the chute intermediate the ends of the door and tiltable to discharge material along the gate surface in a direction other than that of the normal flow of material over said surface, whereby one end of the door drops downwardly and the other end of the door rises across the plane of the chute surface, and a magnetic separator including magnetic means for causing opening and closing of said door in accordance with the energization and deenergization of said separator.

11. In combination with a chute, a trap door forming a portion of the bottom of said chute and being tiltable to discharge material directly from its end normally nearest the upper end of the chute, and a magnetic separator including means for magnetically releasing said door and for magnetically moving the same to closed position.

12. In combination with a chute, a trap door forming a portion of the bottom of the chute and tiltable so as to depress its end nearer the upper end of the chute and to raise its other end across the plane of the chute surface, and means for magnetically releasing said door and for actuating the same to closed position, said means comprising a magnetic separator adapted in the closed position of the door to retain magnetic material traversing the chute.

13. The combination with an inclined feed chute and a magnet positioned therebeneath, of a leveling plate provided with a pivotal mounting in a plane transverse with respect to the chute and substantially normal to a portion thereof above a pole of said magnet, said plate having an armature portion normally hanging directly below the pivotal mounting of said plate and adapted by the energization of the magnet to be drawn toward said plane.

14. The combination with a feed chute and a separator magnet therebeneath, of a leveling plate movable between a retracted position of relatively great clearance with respect to the bottom of the chute, and an operating position of relatively less clearance with respect to the bottom of the chute, said plate tending normally to resume its retracted position and being provided with an armature portion adapted to be drawn by the energization of the magnet toward the bottom of the chute.

15. The combination with a feed chute and a separator magnet associated therewith, of a trap door in the bottom of the chute beyond the magnet, a leveling plate adapted to act upon material passing through said chute toward the magnet, and armatures connected respectively with said door and plate and adapted to maintain said plate in a predetermined spaced relation to the bottom of the chute and said door in a closed position while the magnet is energized, said plate being automatically movable to a position affording greater clearance from the bottom of the chute and said door being automatically movable to an open position upon deenergization of the magnet, whereby material held by said plate, as well as material held by said magnet, will be discharged from said chute upon the deenergization of the magnet.

16. The combination with a feed chute and a separator magnet, of a trap door in said chute provided with means for holding said door closed only when said magnet is energized, said door being self-opening to discharge material held by the magnet upon deenergization thereof, and a leveling plate mounted in said chute in a position to act upon material passing toward said magnet, said plate being pivotally mounted and adapted to assume a position of maximum clearance with respect to the bottom of the chute and provided with an armature subject to the attraction of said magnet, and adapted when said magnet is energized, to draw said door toward a position of minimum clearance with respect to the bottom of the chute, but spaced therefrom.

17. The combination with a chute having an opening in its bottom and a separator magnet associated with the bottom of the chute in the path of material approaching said opening, of a door pivoted in said opening and adapted in its closed position to underlie a portion of said chute above the opening, said chute portion comprising magnetizable material energized by said magnet and the underlying portion of said door constituting its discharge portion, together with an armature connected with said door and subject to the attraction of said magnet which constitutes the sole source of energy for closing said door, whereby said door is adapted to open immediately upon deenergization of said magnet for the immediate release from said discharge portion of magnetic material held at the portion of said chute adjacent the opening therein.

18. The combination with a chute having an opening in its bottom and a separator magnet associated with the portion of said chute immediately above the opening, of a trap door pivoted in said chute and having a discharge portion underlying that part of the bottom of the chute to which the magnet is applied, the discharge portion of said door having a magnet connected therewith and constituting the sole means for controlling the opening and closing movements of the door, said door being counterbalanced to enable its movement in accordance with the attraction of said magnet, whereby said door is closed and opened in accordance with the energization and deenergization of said magnet and material supported upon and immediately adjacent said door at the moment of deenergization, is necessarily discharged therefrom without further traversing said chute.

19. The combination with a chute having an opening in its bottom and a separator magnet mounted beneath the bottom of the chute and of which a polar extension is disposed across the bottom of the chute adjacent the opening therein, of a door pivotally connected with said chute and having a discharge portion at its upper end underlying said polar extension, said door tending normally to assume a position in which said discharge portion swings below the chute and the lower end of the door is elevated as a barrier across the chute, the discharge portion of the door comprising an armature subject at all times to the attraction of said magnet and the polar extension thereof, whereby said magnet constitutes the sole means of closing and permitting the opening of said door in accordance with the energization and deenergization of the magnet, and said door is adapted immediately to discharge magnetic material accumulated thereon beyond said polar extension.

HAROLD W. HARMAN.